(12) United States Patent
Wojciechowski et al.

(10) Patent No.: US 10,928,197 B2
(45) Date of Patent: Feb. 23, 2021

(54) LEVEL VIAL MOUNTING SYSTEM FOR A BOX BEAM LEVEL

(71) Applicant: Diamond Tech LLC, Carson City, NV (US)

(72) Inventors: Timothy J. Wojciechowski, Hubertus, WI (US); David C. Mencel, Menomonee Falls, WI (US)

(73) Assignee: Diamond Tech LLC, Carson City, NV (US)

(*) Notice: Subject to any disclaimer, the term of this patent is extended or adjusted under 35 U.S.C. 154(b) by 190 days.

(21) Appl. No.: 16/270,222

(22) Filed: Feb. 7, 2019

(65) Prior Publication Data
US 2020/0256673 A1    Aug. 13, 2020

(51) Int. Cl.
*G01C 9/28* (2006.01)
*G01C 9/34* (2006.01)

(52) U.S. Cl.
CPC ........ *G01C 9/28* (2013.01); *G01C 9/34* (2013.01)

(58) Field of Classification Search
CPC .................................... G01C 9/28; G01C 9/34
USPC ........................... 33/379, 380, 381, 383, 384
See application file for complete search history.

(56) References Cited

U.S. PATENT DOCUMENTS

| | | | |
|---|---|---|---|
| 6,675,490 B1 * | 1/2004 | Krehel | G01C 9/26 33/365 |
| 7,472,486 B2 | 1/2009 | Tran et al. | |
| 7,472,487 B2 | 1/2009 | Tran et al. | |
| 7,765,706 B2 | 8/2010 | Scheyer | |
| 7,832,112 B2 * | 11/2010 | Christianson | G01C 9/28 33/365 |
| 8,914,987 B2 | 12/2014 | Sanchez | |
| 2005/0160610 A1 * | 7/2005 | Scheyer | G01C 25/00 33/379 |
| 2009/0139102 A1 * | 6/2009 | Kallabis | G01C 9/32 33/379 |
| 2010/0115780 A1 * | 5/2010 | Christianson | G01C 9/28 33/365 |
| 2010/0218391 A1 * | 9/2010 | Christianson | G01C 9/28 33/379 |
| 2011/0099824 A1 | 5/2011 | Christianson et al. | |
| 2016/0138918 A1 | 5/2016 | Neitzell et al. | |
| 2017/0131098 A1 | 5/2017 | Yu | |
| 2017/0343347 A1 | 11/2017 | Liao | |
| 2020/0232793 A1 * | 7/2020 | Millane | G01C 9/34 |

FOREIGN PATENT DOCUMENTS

AU        2015261620        12/2017

* cited by examiner

*Primary Examiner* — George B Bennett
(74) *Attorney, Agent, or Firm* — Boyle Fredrickson, S.C.

(57) ABSTRACT

A level includes a level body having top, bottom and side walls, and a window that opens into the interior of the body. A level vial, which is secured to a vial mount, is positioned within the window opening. A vial retainer is secured within the interior of the level body, and includes a lower portion engaged with the bottom wall and upper portions engaged with the upper wall on either side of the window opening. The vial mount is secured to the vial retainer to secure the vial in a position in which the vial is visible from the exterior of the level body through the window. A vial position adjustment arrangement is provided for adjusting the position of the vial relative to the level body when the vial mount is secured to the vial retainer.

21 Claims, 6 Drawing Sheets

LEVEL VIAL MOUNTING SYSTEM FOR A BOX BEAM LEVEL

BACKGROUND AND SUMMARY

This invention relates to a level, and more particularly to a system for mounting a level vial to a box-type body of a level.

A level typically includes at least one vial for indicating the position of a surface relative to level, along with other vials, such as one or more plumb vials, for indicating the position of a surface relative to vertical. Various types of levels are known, with typical examples being levels having a box-type level body and levels having an I-beam type level body. In levels having a box-type level body, it is advantageous to provide visibility of the level vial from both sides of the level body as well as from the top of the level body. This presents challenges in mounting the level vial to the level body in a manner that firmly secures the level vial in position and at the same time provides the desired visibility of the top and sides of the vial. Levels of this type also present challenges in mounting the vial in a manner that enables the orientation of the vial to be adjusted to ensure its orientation relative to the level body to provide accurate level measurement. The level vial mounting system of the present invention addresses these challenges.

In accordance with one aspect of the present invention, a level includes a level body having a top wall, a bottom wall and a pair of sidewalls extending between and interconnecting the top wall and the bottom wall. The top wall, bottom wall and sidewalls cooperate to define an interior of the level body, and the level body includes a window opening. A level vial, which is secured to a vial mount, is positioned within the window opening. A vial retainer is secured within the interior of the level body, and includes a lower portion engaged with an upwardly facing surface defined by the bottom wall and a pair of spaced-apart upper portions engaged with a downwardly facing surface defined by the upper wall and located one on either side of the window opening. Engagement of the lower portion of the vial retainer with the upwardly facing surface defined by the bottom wall, in combination with engagement of the upper portions of the vial retainer with the downwardly facing surface of the upper wall, prevents upward-downward movement of the vial retainer relative to the level body. The vial mount is secured to the vial retainer to secure the vial in a position in which the vial is visible from the exterior of the level body through the window.

Representatively, the vial mount may be secured to the vial retainer via a snap-fit connection, which includes one or more resilient tabs on one of the vial mount and the vial retainer in combination with one or more slots on the other of the vial mount and the vial retainer. The one or more resilient tabs is engageable within the one or more slots upon downward movement of the vial mount relative to the vial retainer.

The level may include a vial position adjustment arrangement for adjusting the position of the vial relative to the level body when the vial mount is secured to the vial retainer. In one embodiment, the vial mount includes a base and a vial carrier, and the vial position adjustment arrangement is interposed between the base and the vial carrier for adjusting the position of the vial. Representatively, the vial position adjustment arrangement may be in the form of a rocker-type surface, such as facing arcuate surfaces, interposed between the base and the vial carrier, in combination with a pair of threaded connectors located one on either side of the rocker-type surface. The threaded connectors and the rocker-type surface are capable of adjusting the angular position of the vial relative to the level body while at the same time securing the vial carrier to the base.

The pair of spaced-apart upper portions defined by the vial retainer may be in the form of a pair of resilient arms extending upwardly from the lower portion of the vial retainer. The window may be formed at least in part by a pair of spaced-apart edges defined by the top wall of the level body, and the vial retainer may be inserted downwardly through the opening in the top wall of the level body by flexing the resilient arms from an at-rest orientation toward each other to enable the resilient arms to pass through the opening. When the vial retainer is positioned within the interior of the level body, the resilient arms are allowed to return to their at-rest orientation such that upper ends defined by the resilient arms engage the downwardly facing surface of the top wall adjacent the edges of the top wall.

The present invention also contemplates a method of securing a level vial to a level body. Generally, the method involves securing a vial retainer within the interior of the level body by engaging a lower portion of the vial retainer with an upwardly facing surface defined by the bottom wall and engaging a pair of spaced-apart upper portions of the vial retainer with a downwardly facing surface defined by the upper wall one on either side of the window opening, and securing the vial mount to the vial retainer such that the vial is visible from the exterior of the level body through the window. The act of securing the vial mount to the vial retainer may be carried out via a snap-fit connection that includes one or more resilient tabs on one of the vial mount and the vial retainer in combination with one or more slots on the other of the vial mount and the vial retainer, with downward movement of the vial mount relative to the vial retainer causing engagement of the one or more tabs within the one or more slots to secure the vial mount to the vial retainer.

The pair of spaced-apart upper portions of the vial retainer may be in the form of a pair of resilient arms extending upwardly from the lower portion of the vial retainer, and the vial retainer may be secured to the level body by flexing the resilient arms of the vial retainer from an at-rest orientation toward each other, inserting the vial retainer downwardly through the opening in the top wall of the level body to enable the resilient arms to pass through the opening, and releasing the resilient arms to allow the resilient arms to return to their at-rest orientation, so that upper ends defined by the resilient arms engage the downwardly facing surface of the top wall adjacent the edges of the top wall.

This aspect of the invention may also involve adjusting the position of the level vial relative to the level body subsequent to the vial mount and the vial retainer being secured together. To accomplish this, the vial mount may be in the form of a vial carrier secured to a base, with a rocker-type surface being positioned between the vial carrier and the base. The act of adjusting the position of the level vial relative to the level body is carried out using a pair of threaded adjustment members located one on either side of the rocker-type surface, which secure the vail carrier to the base.

It is within the scope of the present invention that the individual features as summarized above may be employed separately from each other or in various combinations or subcombinations as desired.

Other aspects, features and advantages of the invention will become apparent to those skilled in the art from the following detailed description and accompanying drawings.

It should be understood, however, that the detailed description and specific examples, while indicating certain embodiments of the present invention, are given by way of illustration and not of limitation. Many changes and modifications may be made within the scope of the present invention without departing from the spirit thereof, and invention includes all such modifications.

BRIEF DESCRIPTION OF THE DRAWINGS

A clear conception of the advantages and features constituting the present invention, and the construction and operation of typical mechanisms provided with the present invention, will become more readily apparent by referring to be exemplary, and therefore non-limiting, embodiment illustrated in the drawings accompanying and forming a part of this specification, wherein like reference numerals designate the same elements can be several views, and in which.

Figure 1:
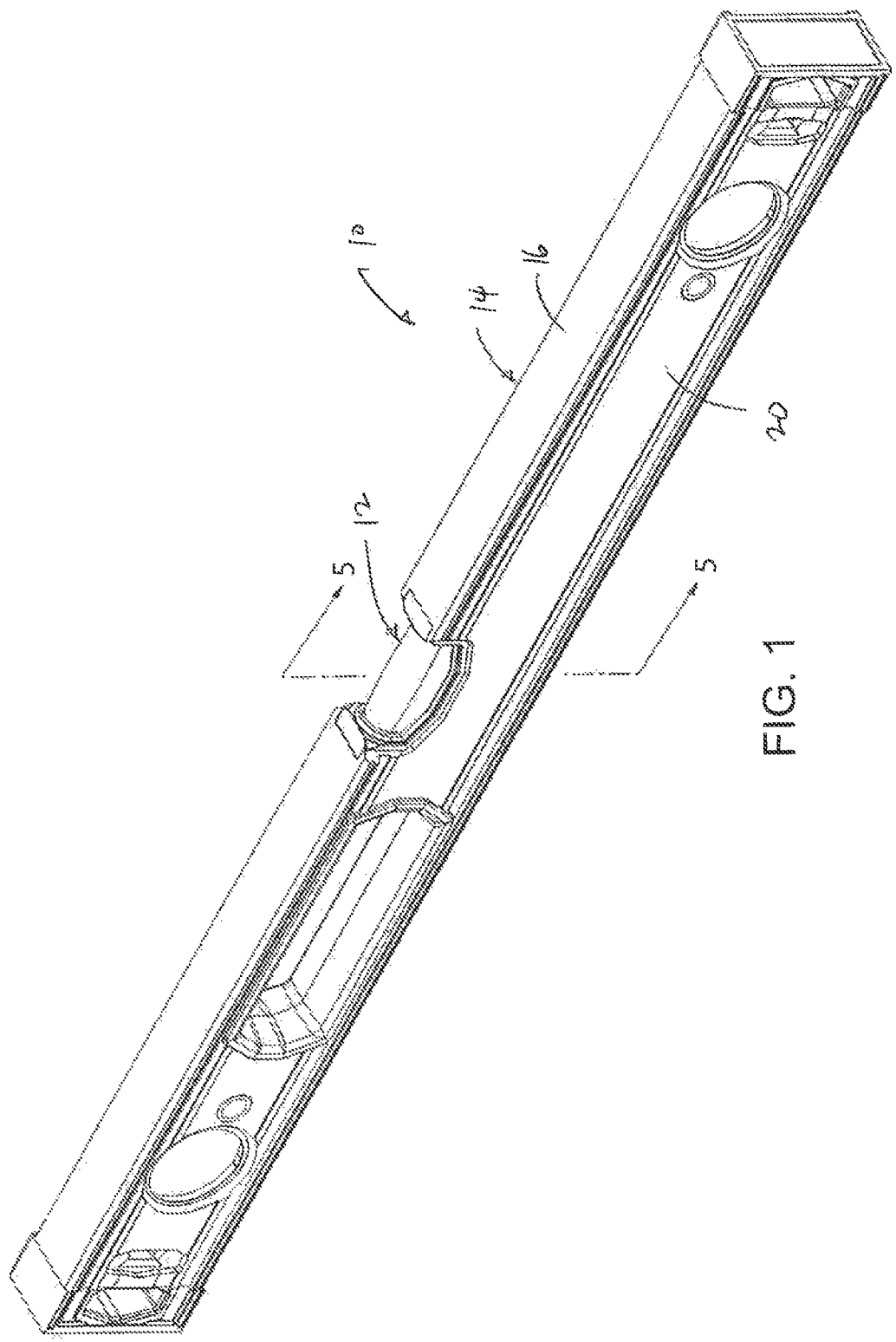
FIG. 1 is an isometric view of a level incorporating a level vial mounting system in accordance with the present invention.

In describing the embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected," "attached," or terms similar thereto are often used. They are not limited to direct connection or attachment, but include connection or attachment to other elements where such connection or attachment is recognized as being equivalent by those skilled in the art.

DETAILED DESCRIPTION

The various features and advantageous details of the subject matter disclosed herein are explained more fully with reference to the non-limiting embodiment described in detail in the following description.

Figure 2:
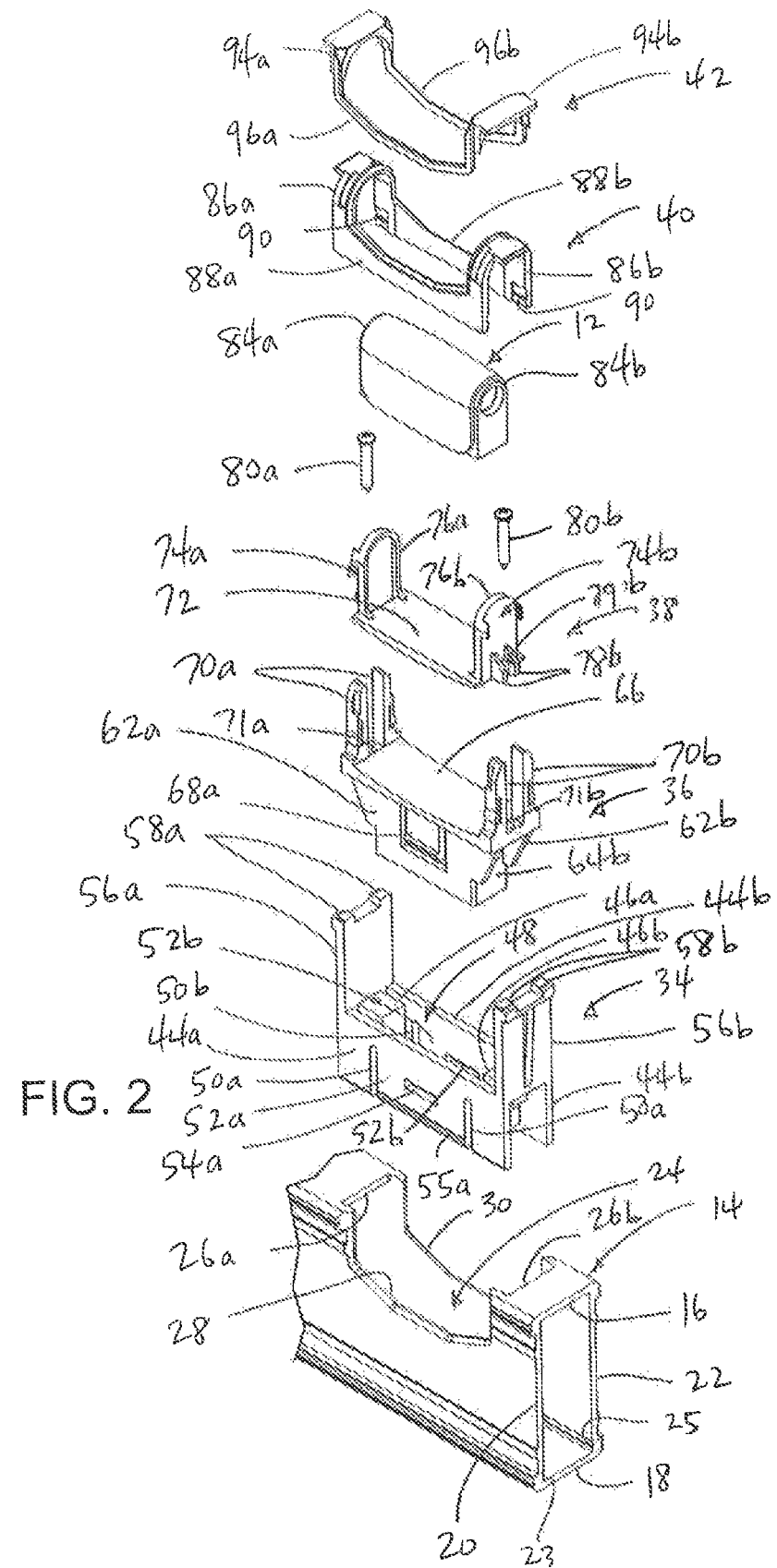
FIG. 2 is an exploded isometric view showing a portion of the frame of the level of FIG. 1 and the components of the level vial mounting system of the present invention.

FIG. 1 illustrates a level 10 that includes a level vial 12 which is secured in position using a level vial mounting system in accordance with the present invention. In a manner as is known, as shown in FIGS. 1 and 2, the level 10 includes a box-type frame or body 14 having a top wall 16, a bottom wall 18, and a pair of sidewalls 20, 22 that extend between and interconnect top wall 16 and bottom wall 18. The top wall 16, bottom wall 18 and sidewalls 20, 22 cooperate to define an interior 24 of level body 14. Within interior 24, the lower area of sidewall 20 is provided with a channel 23 just above the top surface of level body bottom wall 18. Similarly, the lower area of sidewall 22 is provided with a channel 25 just above the top surface of level body bottom wall 18.

The level body 14 includes a window that provides visibility of level vial 12. In the illustrated embodiment, the window is formed by an opening in top wall 14 located between a pair of spaced-apart edges 26a, 26b, in combination with a cut-out area of sidewall 20 defined by a sidewall edge 28 and a cut-out area of sidewall 22 defined by a sidewall edge 30.

Figure 3:
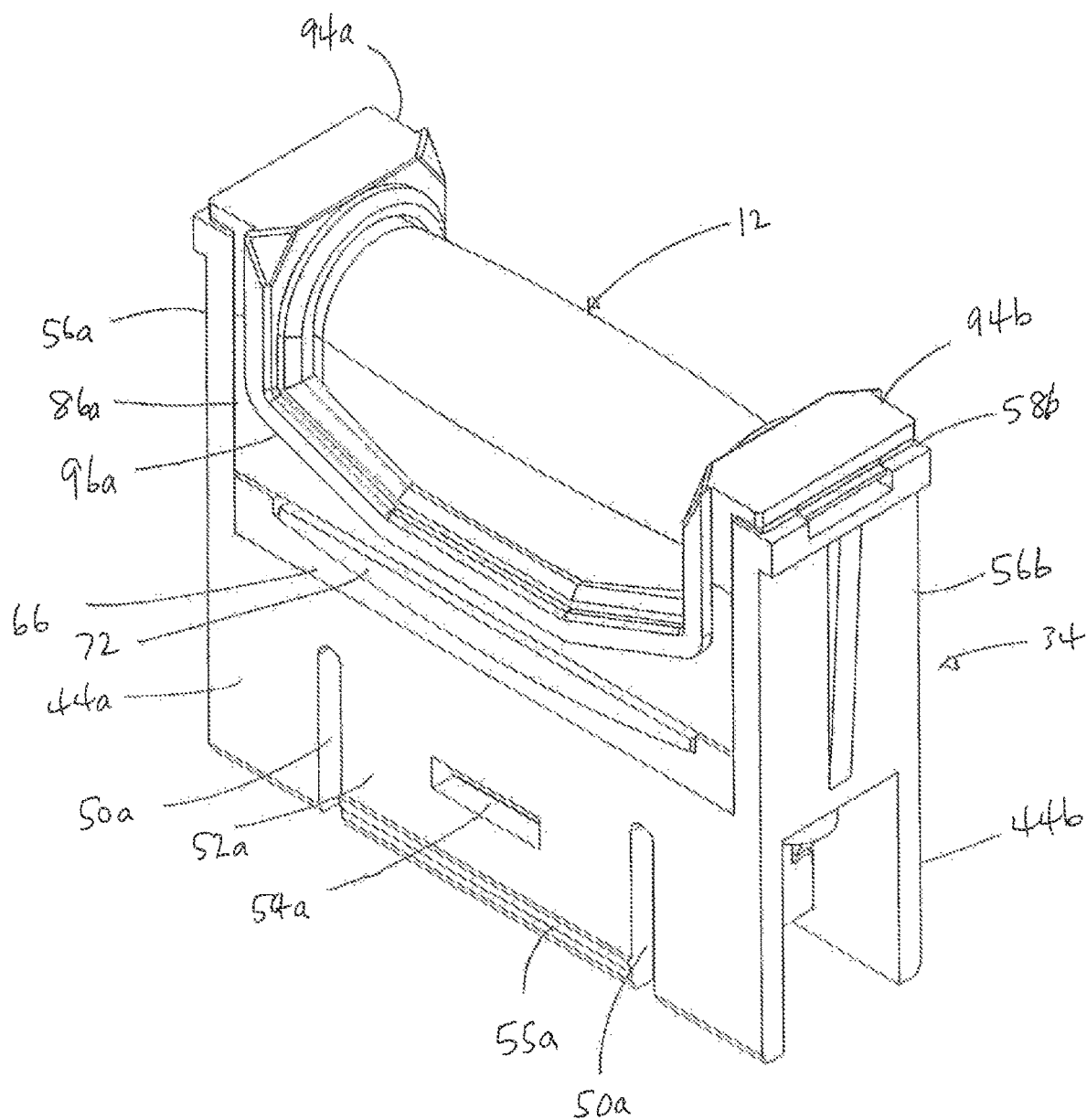
FIG. 3 is an isometric view of the level vial mounting system of the present invention separate from the level body, in which the components of the level vial mounting system of FIG. 2 are assembled together.
Figure 4:
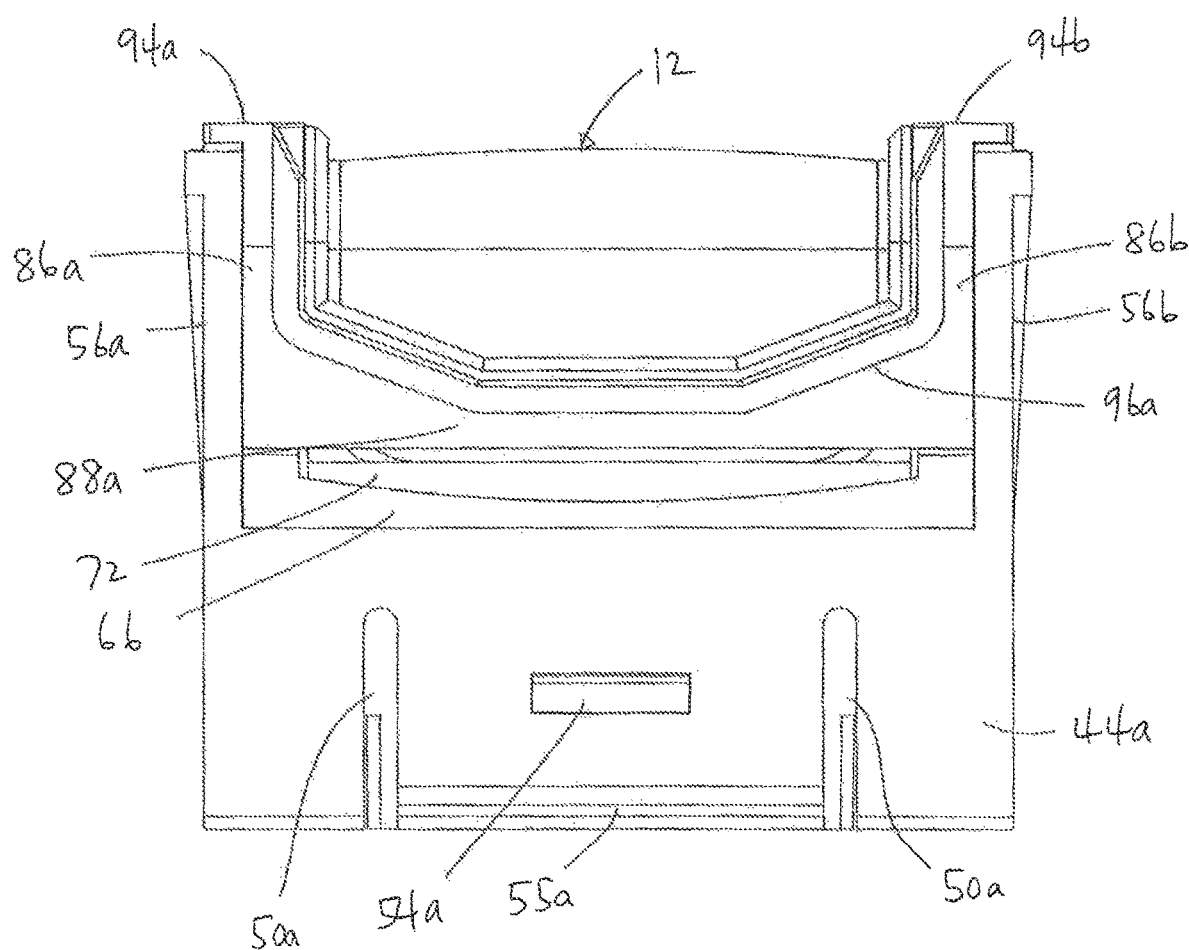
FIG. 4 is an elevation view of the assembled level vial mounting system of FIG. 3.

FIGS. 2 and 3 illustrate the level vial mounting system or assembly in accordance with the present invention, which is employed to secure level vial 12 in position relative to level body 14. The level vial mounting system or assembly generally includes a vial retainer 34 in combination with a vial mount that includes a base 36 and a vial carrier 38. The vial mounting system or assembly also includes a cover 40 and a frame 42. In a manner to be explained, the vial retainer 34, vial mount base 36 and carrier 38 function to secure the vial 12 to the level body 14. The cover 40 and frame 42 function to protect the vial 12 and provide visibility of vial 12 when the vial 12 is secured in position on level body 14.

Still referring to FIGS. 2 and 3, the vial retainer 34 includes a lower portion having a pair of sidewalls 44a, 44b between which a pair of end sections 46a, 46b are located. The sidewalls 44a, 44b and end sections 46a, 46b cooperate to define an internal cavity 48 in the lower portion of vial retainer 34. The sidewalls 44a, 44b are provided with respective vertical slots 50a, 50b, which form respective central wall sections 52a, 52b. Horizontal slots 54a, 54b are formed in central wall sections 52a, 52b, respectively. Central wall sections 52a, 52b also include respective ribs 55a, 55b between the vertical slots 50a, 50b.

The vial retainer 34 also includes a pair of spaced-apart arms 56a, 56b that extend upwardly from the above-described lower portion of vial retainer 34 at opposite ends defined by vial retainer 34. Arm 56a has a pair of shouldered bosses 58a at its upper end, and likewise arm 56b has a pair of shouldered bosses 58b at its upper end.

Vial mount base 36 includes a lower portion having a pair of sidewalls 62a, 62b and a pair of end walls 64a, 64b. Vial mount base 36 further includes a support wall 66 having an arcuate upper surface. Below support wall 66, sidewalls 62a, 62b include cut-out areas within which resilient shouldered tabs 68a, 68b, respectively, are located. Pairs of laterally spaced prongs 70a, 70b extend upwardly from support wall at each end of vial mount base 36. A passage 71a is formed in the portion of support wall 66 located between the lower ends of prongs 70a, and likewise a passage 71b is formed in the portion of support wall 66 located between the lower ends of prongs 70b.

Vial carrier 38 includes a bottom wall 72 having an arcuate lower surface, and a pair of end walls 74a, 74b that extend upwardly one from each end of bottom wall 72. End walls 74a, 74b define facing rims 76a, 76b, respectively. A pair of tabs 78a extend outwardly from vial carrier end wall 74a, and likewise a pair of tabs 78b extend outwardly from end wall 74b. Shouldered passages 79a, 79b are defined between tabs 78a, 78b, respectively. As will be explained, a pair of threaded members, such as screws 80a, 80b, are employed to secure vial carrier 38 to vial mount base 36.

The level vial 12 is of the type commonly known as a block vial, being formed of a single piece of material within which a bore or passage is formed and that contains a quantity of liquid that forms a level-indicating bubble. In the illustrated embodiment, the ends of vial 12 are formed with shoulders 84a, 84b. The bottom of vial 12 is flat and is adapted to rest on and be supported by the upper surface of vial carrier bottom wall 38. The shoulders 84a, 84b have an external configuration that matches the internal configuration defined by rims 76a, 76b on the respective end walls 74a, 74b of vial carrier 38, so that the ends of vial 12 are received within and surrounded by rims 76a, 76b, respectively, when the bottom of vial 12 is positioned on the upper surface of vial carrier bottom wall 38. In this manner, the vial 12 and the vial carrier 38 are assembled together into a subassembly for mounting to level body 14, in a manner to be explained.

The cover 40 is configured to overlie level vial 12. The cover 40 includes a pair of end sections 86a, 86b, and side sections 88a, 88b that extend between and connect the end sections 86a, 86b. The cover end sections 86a, 86b and side sections 88a, 88b cooperate to define open areas that face upwardly and outwardly, and that generally correspond in shape to the window in level body 14. In this manner, the cover 40 provides visibility to the top and both sides of level vial 12 when cover 40 is positioned on level vial 12. The cover 40 includes engagement tabs such as shown at 90 that provide a snap-fit onto side lips defined by level vial 12 to enable cover 40 to be engaged with and secured to level vial 12.

Frame 42 includes a pair of end portions 94a, 94b and a pair of side members 96a, 96b that extend between and interconnect end portions 94a, 94b. The end portions 94a, 94b of frame 42 are configured to be positioned over and secured to the end sections 86a, 86b, respectively, of cover 40. Frame 42 defines an open area configured similarly to that of cover 40 to provide visibility to the top and sides of level vial 12. The frame 42 also serves to provide protection to the exposed surfaces of level vial 12.

The following describes the manner in which level vial 12 is assembled to level body 14 using vial retainer 34, vial mount base 36, vial carrier 38, cover 40 and frame 42.

Figure 5:
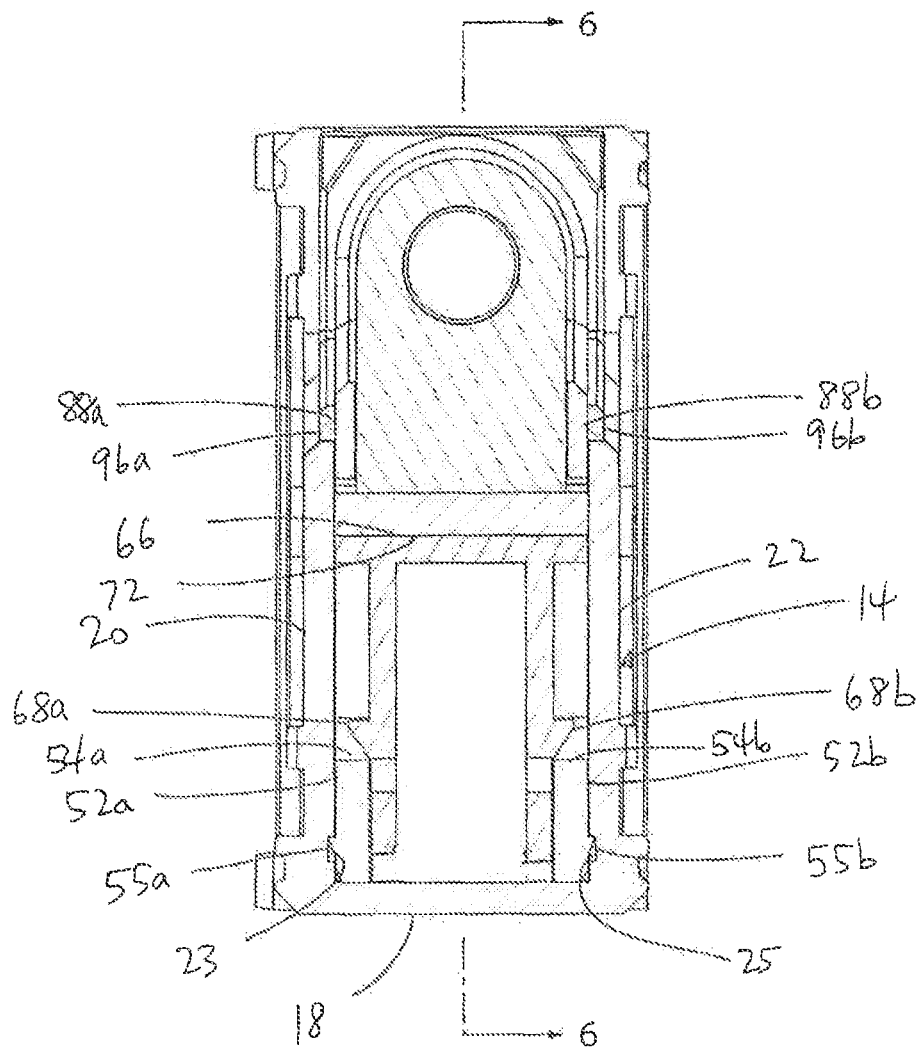
FIG. 5 is a section view taken along line 5-5 of FIG. 1.
Figure 6:
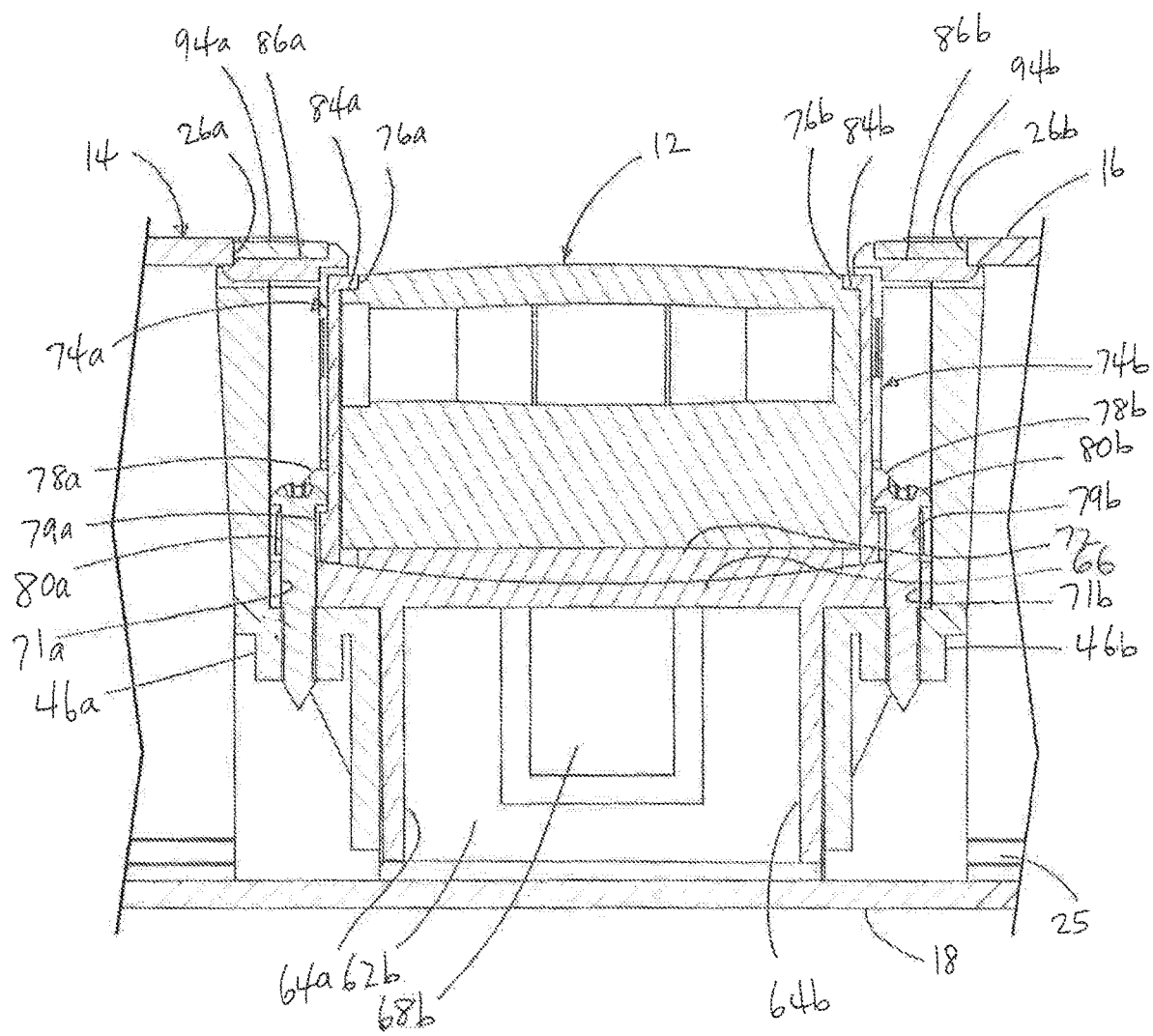
FIG. 6 is a partial section view taken along line 6-6 of FIG. 5.

In a first assembly step, vial retainer 34 is inserted into, and positioned within, the interior 24 of level body 14. To accomplish this, the lower portion of vial retainer 34 is inserted through the opening in top wall 16 between top wall edges 26a, 26b. The lower portion of vial retainer 34 has a length only slightly less than the width of the opening defined between top wall ages 26a, 26b. The arms 56a, 56b of vial retainer 34 are then flexed toward each other and vial retainer 34 is advanced further into the interior 24 of level body 14. Such inward flexing of arms 56a, 56b allows arms 56a, 56b to advance past the top wall edges 26a, 26b. Vial retainer 34 continues to be advanced into the interior 24 of level body 14 until the bottom edges of vial retainer sidewalls 44a, 44b come into contact with the top surface of level body bottom wall 18, as shown in FIGS. 5 and 6. These figures also illustrate that the width of the lower portion of vial retainer 34 is only slightly less than the width of the level body interior 24 defined between the inner facing surfaces of level body sidewalls 20, 22. Because of this, the sidewall central sections 52a, 52b are flexed slightly inwardly toward each other as vial retainer 34 is advanced into level body interior 24, due to engagement of ribs 55a, 55b with the inner surfaces of level body sidewalls 20, 22, respectively. As vial retainer 34 is advanced so that the bottom edges of vial retainer sidewalls 44a, 44b are brought into engagement with the upwardly facing surface of level body bottom wall 18, the ribs 55a, 55b come into alignment with the respective sidewall channels 23, 25, and the sidewall sections 52a, 52b flex outwardly so as to cause snap-type engagement of ribs 55a, 55b within respective channels 23, 25. When the bottom edges of vial retainer sidewalls 44a, 44b are engaged with the upwardly facing surface of level body bottom wall 18, arms 56a, 56b are allowed to return from their inwardly flexed position to their normal upright position, which brings the shouldered bosses 58a, 58b into engagement with the respective top wall edges 26a, 26b. The outer portion of each shouldered boss 58a underlies the top wall edge 26a, while the inner portion of each shouldered boss 58a contacts the surface of the edge 26a that defines the top wall opening. Similarly, the outer portion of each shouldered boss 58b underlies the top wall edge 26b, while the inner portion of each shouldered boss 58b contacts the surface of the edge 26b that defines the top wall opening. In this manner, the vial retainer 34 is locked to the level body 14 in a manner that prevents both horizontal or axial movement of vial retainer 34 and vertical or up-down movement of vial retainer 34 relative to level body 14.

Once vial retainer is secured to level body 14 as described above, the vial mount base 36 is then engaged with the vial retainer 34. Such engagement of vial mount base 36 may be accomplished either before or after the subassembly of vial carrier 38 and level vial 12 is secured to vial mount base 36. The vial mount base 36 is engaged with the vial retainer 34 by inserting the lower portion of vial mount base 36 into the interior of vial retainer 34 defined by sidewalls 44a, 44b and end sections 46a, 46b. When vial mount base 36 is in an engaged position in which the underside of support wall 66 contacts the upper edges of sidewalls 44a, 44b and end sections 46a, 46b, the tabs 68a, 68b snap into the slots 54a, 54b in respective sidewalls 44a, 44b, as shown in FIG. 5. Vial mount base 36 has a length that enables it to fit snugly between the facing surfaces of vial retainer arms 56a, 56b to prevent horizontal or axial movement of vial mount base 36 relative to vial retainer 34, and engagement of tabs 68a, 68b within slots 54a, 54b prevents vertical or up-down movement of vial mount base 36 relative to vial retainer 34.

As noted, the engagement of vial mount base 36 with vial retainer 34 may occur either before or after the subassembly of vial carrier 38 and level vial 12 is secured to vial mount base 36. In order to secure the subassembly of vial carrier 38 and the level vial 12 to the vial mount base 36, the vial carrier 38 is advanced onto the vial mount base 36 between the pairs of prongs 70a, 70b that extend upwardly from the ends of vial mount base 36. In doing so, the tabs 78a are moved downwardly through the space between the prongs 70a and the tabs 78b are moved downwardly through the space between the prongs 70b. When vial carrier 38 is fully engaged with the vial mount base 36, the arcuate underside of vial carrier bottom wall 72 comes into contact with the arcuate upwardly facing surface of vial mount base support wall 66. When vial carrier 38 is fully engaged with vial mount base 36, outwardly extending tabs on vial carrier end wall 74a are received within vertically extending slots in prongs 70a, and likewise outwardly extending tabs on vial carrier end wall 74b are received within vertically extending slots in prongs 70b. Screws 80a, 80b are then inserted through the respective shouldered passages 79a, 79b and into the respective passages 71a, 71b of vial mount base 36. As shown in FIG. 6, the vial retainer end section 26a includes a passage in alignment with the passage 71a in vial mount base 36 with which the threaded shank of screw 80a is engaged, and likewise the vial retainer end section 26b includes a passage in alignment with the passage 71b in vial mount base 36 with which the threaded shank of screw 80b is engaged, to firmly secure vial carrier 38 to vial mount base 36 and vial retainer 34.

The screws 80a, 80b are first advanced an amount sufficient to firmly engage the vial carrier 38 to the vial mount base 36. Thereafter, the screws 80a, 80b can be selectively advanced or backed out to adjust the position of level vial 12 relative to the level body 14 and to ensure that level vial 12 is in a true level position when level body 14 is placed on a level surface. The rocker-type surface defined by the interface between the arcuate top surface of support wall 66 of vial mount base 36 and the arcuate underside of bottom wall 72 of vial carrier 38 allows such adjustment in the orientation of level vial 12 while maintaining a firm and secure engagement of vial carrier 38 to vial mount base 36.

Once the desired position of level vial 12 has been attained as described above, the cover 40 is snapped onto the level vial 12 and the frame 42 is secured to the cover 40. As noted above, the various surfaces of cover 40 function to overlie, conceal and protect the various spaces and interfaces between the underlying components, to provide both a protective and aesthetic function. The frame 42 is then secured to the cover 40, again to provide a finished appearance and protection of the surfaces of level vial 12.

It can thus be appreciated that the level vial mounting system of the present invention as shown and described provides a relatively simple and secure means for engaging a level vial with a level body and maintaining it in position. The vial mounting system also provides the ability to adjust the position of the vial relative to the level body both during original manufacture and thereafter, if necessary.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It is also understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A level, comprising:
   a level body including a top wall, a bottom wall and a pair of sidewalls extending between and interconnecting the top wall and the bottom wall, wherein the top wall, the bottom wall and the sidewalls cooperate to define an interior of the level body, and wherein the level body includes a window opening;
   a level vial positioned within the window opening of the level body, wherein the level vial is secured to a vial mount;
   a vial retainer secured within the interior of the level body, wherein the vial retainer includes a lower portion engaged with an upwardly facing surface defined by the bottom wall and a pair of spaced-apart upper portions engaged with a downwardly facing surface defined by the upper wall and located one on either side of the window opening, wherein engagement of the lower portion of the vial retainer with the upwardly facing surface defined by the bottom wall and engagement of the upper portions of the vial retainer with the downwardly facing surface of the upper wall prevents upward-downward movement of the vial retainer relative to the level body; and
   wherein the vial mount is secured to the vial retainer and the vial is visible from the exterior of the level body through the window.

2. The level of claim 1, wherein the vial mount is secured to the vial retainer via a snap-fit connection.

3. The level of claim 2, wherein the snap-fit connection includes one or more resilient tabs on one of the vial mount and the vial retainer in combination with one or more slots on the other of the vial mount and the vial retainer, wherein the one or more resilient tabs is engageable within the one or more slots upon downward movement of the vial mount relative to the vial retainer.

4. The level of claim 1, further comprising a vial position adjustment arrangement for adjusting the position of the vial relative to the level body when the vial mount is secured to the vial retainer.

5. The level of claim 4, wherein the vial mount comprises a base and a vial carrier, and wherein the vial position adjustment arrangement is interposed between the base and the vial carrier for adjusting the position of the vial.

6. The level of claim 5, wherein the vial position adjustment arrangement comprises a rocker-type surface interposed between the base and the vial carrier, in combination with a pair of threaded connectors located one on either side of the rocker-type surface, wherein the threaded connectors and the rocker-type surface are capable of adjusting the angular position of the vial relative to the level body and securing the vial carrier to the base.

7. The level of claim 6, wherein the rocker-type surface comprises complementary facing arcuate surfaces defined by the vial carrier and the base.

8. The level of claim 1, wherein the pair of spaced-apart upper portions defined by the vial retainer comprises a pair of resilient arms extending upwardly from the lower portion of the vial retainer.

9. The level of claim 8, wherein the window is defined at least in part by an opening in the top wall of the level body between a pair of spaced-apart edges of the top wall, wherein the vial retainer is inserted downwardly through the opening in the top wall of the level body and the resilient arms of the vial retainer are flexed from an at-rest orientation toward each other to enable the resilient arms to pass through the opening and wherein, when the vial retainer is positioned within the interior of the level body, the resilient arms are allowed to return to their at-rest orientation and upper ends defined by the resilient arms engage the downwardly facing surface of the top wall adjacent the edges of the top wall.

10. A level, comprising:
    a level body including a top wall, a bottom wall and a pair of sidewalls extending between and interconnecting the top wall and the bottom wall, wherein the top wall, the bottom wall and the sidewalls cooperate to define an interior of the level body, and wherein the level body includes a window opening defined at least in part by an opening in the top wall of the level body between a pair of spaced-apart edges of the top wall;
    a level vial positioned within the window opening of the level body, wherein the level vial is secured to a vial mount;
    a vial retainer secured within the interior of the level body, wherein the vial retainer includes a lower portion engaged with an upwardly facing surface defined by the bottom wall and a pair of spaced-apart arms extending upwardly from the lower portion, wherein an upper end of each arm is engaged with a downwardly facing surface defined by the upper wall adjacent one of the pair of spaced-apart edges of the opening in the top wall in the level body, wherein engagement of the lower portion of the vial retainer with the upwardly facing surface defined by the bottom wall and engagement of the upper ends of the arms with the downwardly facing surface of the upper wall prevents upward-downward movement of the vial retainer relative to the level body; and wherein the vial mount is secured to the vial retainer and the vial is visible from the exterior of the level body through the window.

11. The level of claim 10, wherein the vial mount is secured to the vial retainer via a snap-fit connection including one or more resilient tabs on one of the vial mount and the vial retainer in combination with one or more slots on the other of the vial mount and the vial retainer, wherein the one or more resilient tabs is engageable within the one or more slots upon downward movement of the vial mount relative to the vial retainer.

12. The level of claim 10, wherein the vial mount comprises a base and a vial carrier, and further comprising a vial position adjustment arrangement interposed between the base and the vial carrier for adjusting the position of the vial relative to the level body when the vial mount is secured to the vial retainer, wherein the vial position adjustment arrangement comprises a rocker-type surface interposed between the base and the vial carrier, in combination with a pair of threaded connectors located one on either side of the rocker-type surface, wherein the threaded connectors and the rocker-type surface are capable of adjusting the angular position of the vial relative to the level body and securing the vial carrier to the base.

13. A level, comprising:
a level body including a top wall, a bottom wall and a pair of sidewalls extending between and interconnecting the top wall and the bottom wall, wherein the top wall, the bottom wall and the sidewalls cooperate to define an interior of the level body, and wherein the level body includes a window opening;
a level vial positioned within the window opening of the level body, wherein the level vial is secured to a vial mount;
a vial retainer secured within the interior of the level body, wherein the vial mount is secured to the vial retainer and the vial is visible from the exterior of the level body through the window; and
a vial position adjustment arrangement for adjusting the position of the vial relative to the level body when the vial mount is secured to the vial retainer.

14. The level of claim 13, wherein the vial mount comprises a base and a vial carrier, and wherein the vial position adjustment arrangement is interposed between the base and the vial carrier for adjusting the position of the vial.

15. The level of claim 14, wherein the vial position adjustment arrangement comprises a rocker-type surface interposed between the base and the vial carrier, in combination with a pair of threaded connectors located one on either side of the rocker-type surface, wherein the threaded connectors and the rocker-type surface are capable of adjusting the angular position of the vial relative to the level body and securing the vial carrier to the base.

16. The level of claim 15, wherein the rocker-type surface comprises complementary arcuate facing arcuate surfaces defined by the vial carrier and the base.

17. A method of securing a level vial to a level body, wherein the level body includes a top wall, a bottom wall and a pair of sidewalls extending between and interconnecting the top wall and the bottom wall, wherein the top wall, the bottom wall and the sidewalls cooperate to define an interior of the level body, and wherein the level body includes a window opening, comprising the acts of:
securing a vial retainer within the interior of the level body by engaging a lower portion of the vial retainer with an upwardly facing surface defined by the bottom wall and engaging a pair of spaced-apart upper portions of the vial retainer with a downwardly facing surface defined by the upper wall one on either side of the window opening, wherein engagement of the lower portion of the vial retainer with the upwardly facing surface defined by the bottom wall and engagement of the upper portions of the vial retainer with the downwardly facing surface of the upper wall prevents upward-downward movement of the vial retainer relative to the level body; and
securing the vial mount to the vial retainer such that the vial is visible from the exterior of the level body through the window.

18. The method of claim 17, wherein the act of securing the vial mount to the vial retainer is carried out via a snap-fit connection that includes one or more resilient tabs on one of the vial mount and the vial retainer in combination with one or more slots on the other of the vial mount and the vial retainer, wherein downward movement of the vial mount relative to the vial retainer causes engagement of the one or more tabs within the one or more slots to secure the vial mount to the vial retainer.

19. The method of claim 17, wherein the window is defined at least in part by an opening in the top wall of the level body between a pair of spaced-apart edges of the top wall, and wherein the pair of spaced-apart upper portions of the vial retainer comprises a pair of resilient arms extending upwardly from the lower portion of the vial retainer, and wherein the vial retainer secured to the level body by flexing the resilient arms of the vial retainer from an at-rest orientation toward each other, inserting the vial retainer downwardly through the opening in the top wall of the level body to enable the resilient arms to pass through the opening, and releasing the resilient arms to allow the resilient arms to return to their at-rest orientation and upper ends defined by the resilient arms to engage the downwardly facing surface of the top wall adjacent the edges of the top wall.

20. The method of claim 17, further comprising the act of adjusting the position of the level vial relative to the level body subsequent to the vial mount and the vial retainer being secured together.

21. The method of claim 20, wherein the vial mount comprises a vial carrier secured to a base, wherein a rocker-type surface is positioned between the vial carrier and the base, and wherein the act of adjusting the position of the level vial relative to the level body is carried out using a pair of threaded adjustment members located one on either side of the rocker-type surface that secure the vial carrier to the base.

* * * * *